United States Patent
Hosseini et al.

(10) Patent No.: US 11,818,715 B2
(45) Date of Patent: Nov. 14, 2023

(54) HYBRID AUTOMATIC REPEAT REQUEST CODEBOOK DESIGN FOR A SIDELINK

(71) Applicant: QUALCOMM Incorporated, San Diego, CA (US)

(72) Inventors: Seyedkianoush Hosseini, San Diego, CA (US); Wei Yang, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/247,614

(22) Filed: Dec. 17, 2020

(65) Prior Publication Data

US 2022/0201729 A1 Jun. 23, 2022

(51) Int. Cl.
| | |
|---|---|
| *H04W 72/12* | (2023.01) |
| *H04L 1/18* | (2023.01) |
| *H04W 72/20* | (2023.01) |
| *H04L 1/1812* | (2023.01) |
| *H04W 72/0446* | (2023.01) |
| *H04W 92/18* | (2009.01) |

(52) U.S. Cl.
CPC ........... *H04W 72/20* (2023.01); *H04L 1/1812* (2013.01); *H04W 72/0446* (2013.01); *H04W 92/18* (2013.01)

(58) Field of Classification Search
CPC ......... H04W 72/1278; H04W 72/0446; H04W 72/20; H04L 1/1812
USPC ....................................................... 370/329
See application file for complete search history.

(56) References Cited

U.S. PATENT DOCUMENTS

| | | | | |
|---|---|---|---|---|
| 2020/0366419 | A1* | 11/2020 | Panteleev | H04L 1/1854 |
| 2021/0045100 | A1* | 2/2021 | Park | H04L 1/1854 |
| 2022/0132355 | A1* | 4/2022 | Lee | H04W 76/15 |
| 2022/0132558 | A1* | 4/2022 | Lee | H04W 72/54 |
| 2022/0232529 | A1* | 7/2022 | Lin | H04W 72/02 |

FOREIGN PATENT DOCUMENTS

| | | | |
|---|---|---|---|
| EP | 4099751 A1 * | 12/2022 | H04B 7/0626 |
| WO | WO-2021091346 A1 * | 5/2021 | |

OTHER PUBLICATIONS

U.S. Appl. No. 62/933,365, filed Aug. 11, 2019.*
U.S. Appl. No. 62/985,431, filed Mar. 5, 2020.*
Intel Corporation: "Remaining Opens of Physical Layer Procedures for NR V2X Sidelink Design", 3GPP TSG RAN WG1 #102-E, R1-2005849, 3rd Generation Partnership Project, Mobile Competence Centre, 650, Route Des Lucioles, F-06921 Sophia-Antipolis Cedex, France, vol. RAN WG1, No. e-Meeting, 20200817-20200828, Aug. 8, 2020, XP051917750, 5 Pages.
International Search Report and Written Opinion—PCT/US2021/072041 —ISA/EPO—dated Feb. 22, 2022.

* cited by examiner

*Primary Examiner* — Faisal Choudhury
(74) *Attorney, Agent, or Firm* — Harrity & Harrity, LLP

(57) ABSTRACT

Various aspects of the present disclosure generally relate to wireless communication. In some aspects, a first user equipment (UE) may receive, from a second UE via a sidelink interface, a triggering signal associated with triggering hybrid automatic repeat request (HARQ) feedback for a sidelink. The UE may transmit, to the second UE and based at least in part on the triggering signal, HARQ feedback associated with the second UE. Numerous other aspects are provided.

30 Claims, 12 Drawing Sheets

HYBRID AUTOMATIC REPEAT REQUEST CODEBOOK DESIGN FOR A SIDELINK

FIELD OF THE DISCLOSURE

Aspects of the present disclosure generally relate to wireless communication and to techniques and apparatuses for hybrid automatic repeat request (HARQ) codebook design for a sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving, from a second UE via a sidelink interface, a triggering signal associated with triggering hybrid automatic repeat request (HARQ) feedback for a sidelink; and transmitting, to the second UE and based at least in part on the triggering signal, HARQ feedback associated with the second UE.

In some aspects, a method of wireless communication performed by a first UE includes transmitting, to a second UE via a sidelink interface, a triggering signal associated with triggering HARQ feedback for a sidelink; and receiving, from the second UE and based at least in part on the triggering signal, HARQ feedback associated with the first UE.

In some aspects, a first UE for wireless communication includes a memory; and one or more processors operatively coupled to the memory, the memory and the one or more processors configured to: receive, from a second UE via a sidelink interface, a triggering signal associated with triggering HARQ feedback for a sidelink; and transmit, to the second UE and based at least in part on the triggering signal, HARQ feedback associated with the second UE.

In some aspects, a first UE for wireless communication includes a memory; and one or more processors operatively coupled to the memory, the memory and the one or more processors configured to: transmit, to a second UE via a sidelink interface, a triggering signal associated with triggering HARQ feedback for a sidelink; and receive, from the second UE and based at least in part on the triggering signal, HARQ feedback associated with the first UE.

In some aspects, a non-transitory computer-readable medium storing a set of instructions for wireless communication includes one or more instructions that, when executed by one or more processors of a first UE, cause the first UE to: receive, from a second UE via a sidelink interface, a triggering signal associated with triggering HARQ feedback for a sidelink; and transmit, to the second UE and based at least in part on the triggering signal, HARQ feedback associated with the second UE.

In some aspects, a non-transitory computer-readable medium storing a set of instructions for wireless communication includes one or more instructions that, when executed by one or more processors of a first UE, cause the first UE to: transmit, to a second UE via a sidelink interface, a triggering signal associated with triggering HARQ feedback for a sidelink; and receive, from the second UE and based at least in part on the triggering signal, HARQ feedback associated with the first UE.

In some aspects, an apparatus for wireless communication includes means for receiving, from a UE via a sidelink interface, a triggering signal associated with triggering HARQ feedback for a sidelink; and means for transmitting, to the UE and based at least in part on the triggering signal, HARQ feedback associated with the UE.

In some aspects, an apparatus for wireless communication includes means for transmitting, to a UE via a sidelink interface, a triggering signal associated with triggering HARQ feedback for a sidelink; and means for receiving, from the UE and based at least in part on the triggering signal, HARQ feedback associated with the apparatus.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
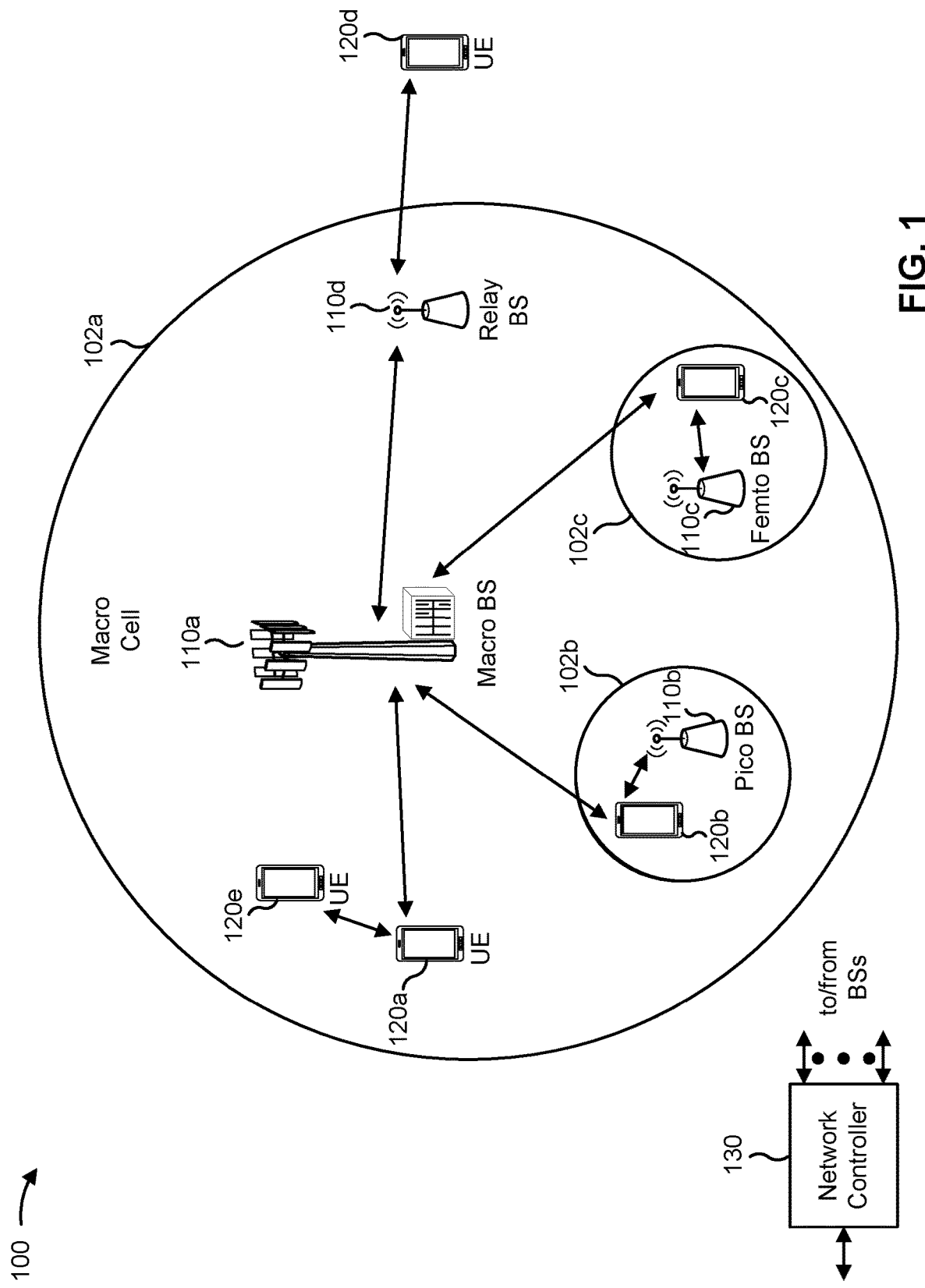
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
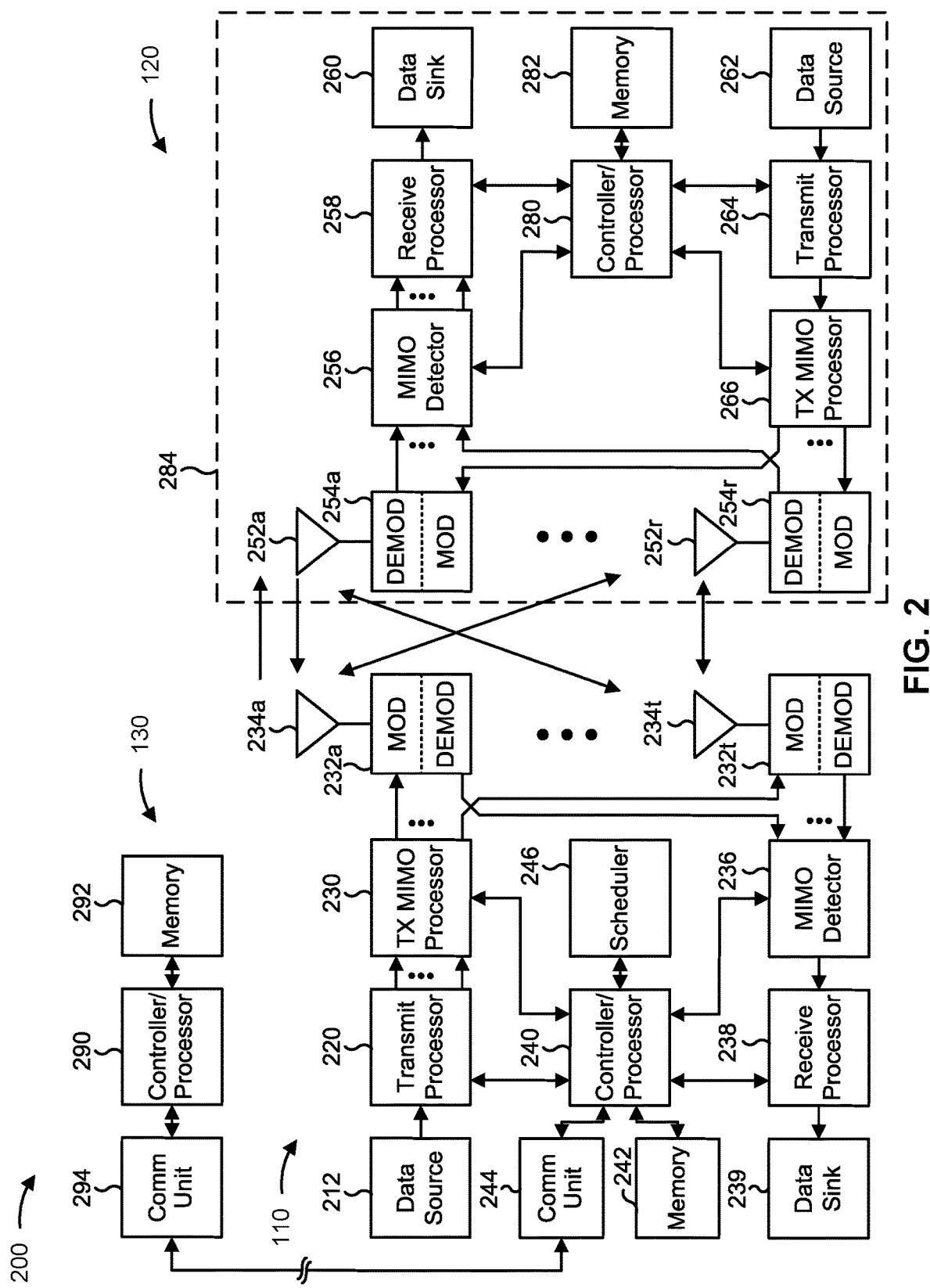
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-8.

Controller/processor 240 of base station 110, controller/processor 280 of UE 120, and/or any other component(s) of FIG. 2 may perform one or more techniques associated with hybrid automatic repeat request (HARQ) codebook design for a sidelink, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the first UE includes means for receiving, from a second UE via a sidelink interface, a triggering signal associated with triggering HARQ feedback for a sidelink; or means for transmitting, to the second UE and based at least in part on the triggering signal, HARQ feedback associated with the second UE. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for receiving information indicating whether to provide at least one of the one-shot HARQ feedback, semi-static HARQ feedback, or dynamic HARQ feedback.

In some aspects, the first UE includes means for transmitting information indicating a number of HARQ codebooks that the first UE is capable of simultaneously generating, wherein the HARQ feedback is based at least in part on the number of HARQ codebooks.

In some aspects, the first UE includes means for transmitting, to a second UE via a sidelink interface, a triggering signal associated with triggering HARQ feedback for a sidelink; or means for receiving, from the second UE and based at least in part on the triggering signal, HARQ feedback associated with the first UE. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for transmitting information indicating whether to provide at least one of the one-shot HARQ feedback, semi-static HARQ feedback, or dynamic HARQ feedback.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
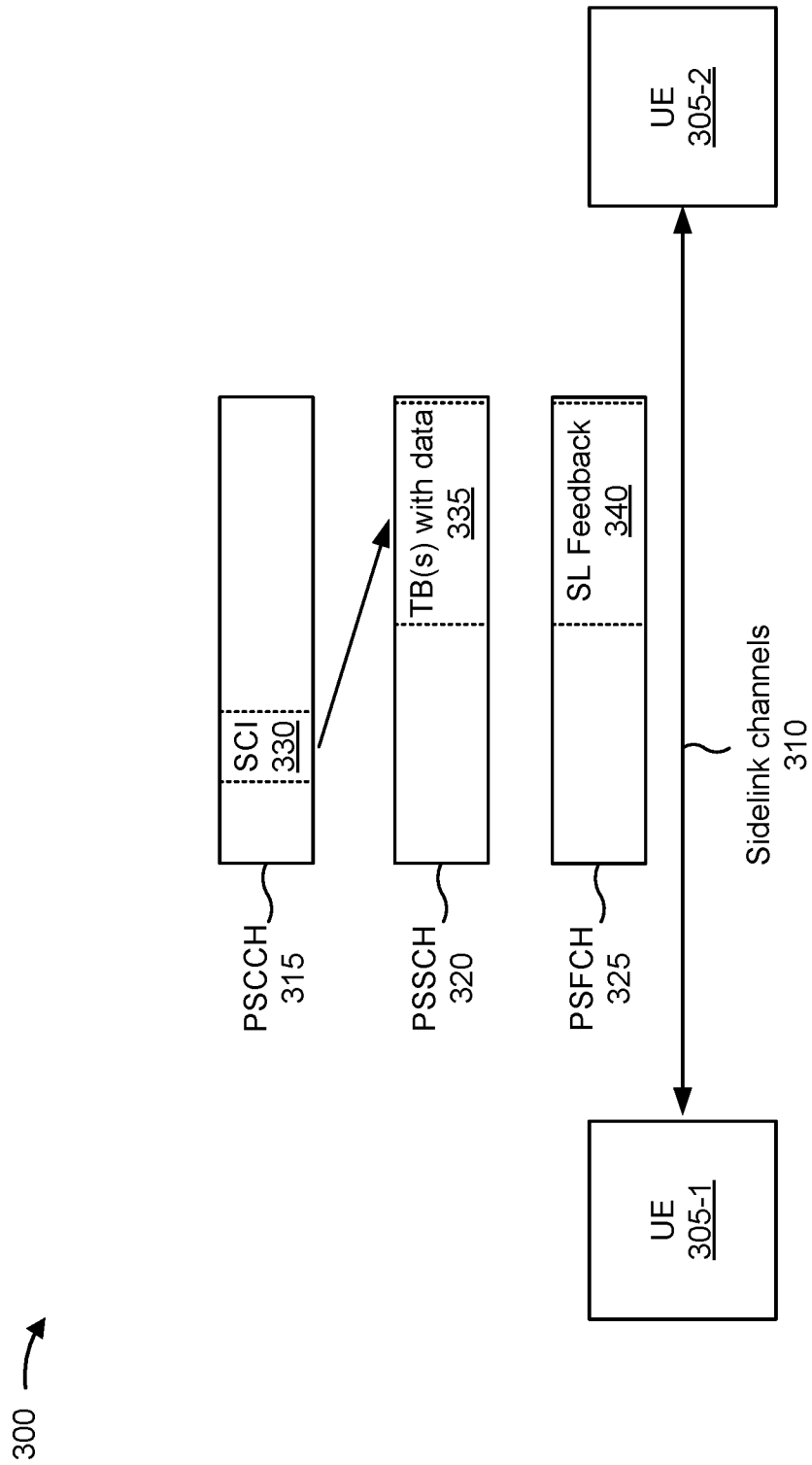
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as HARQ feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
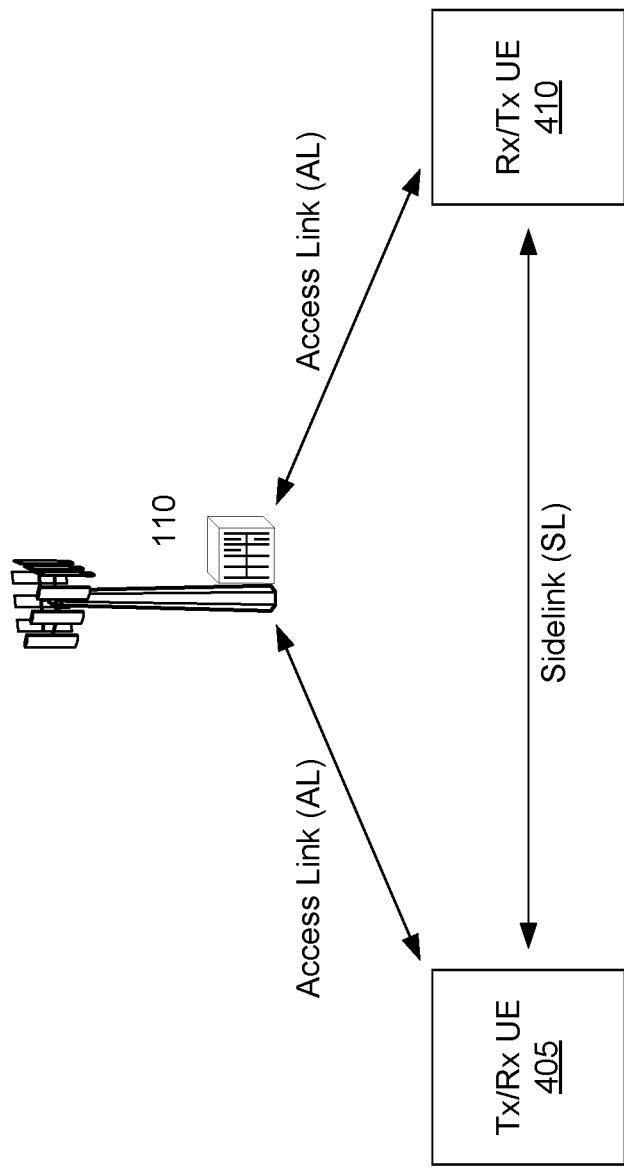
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
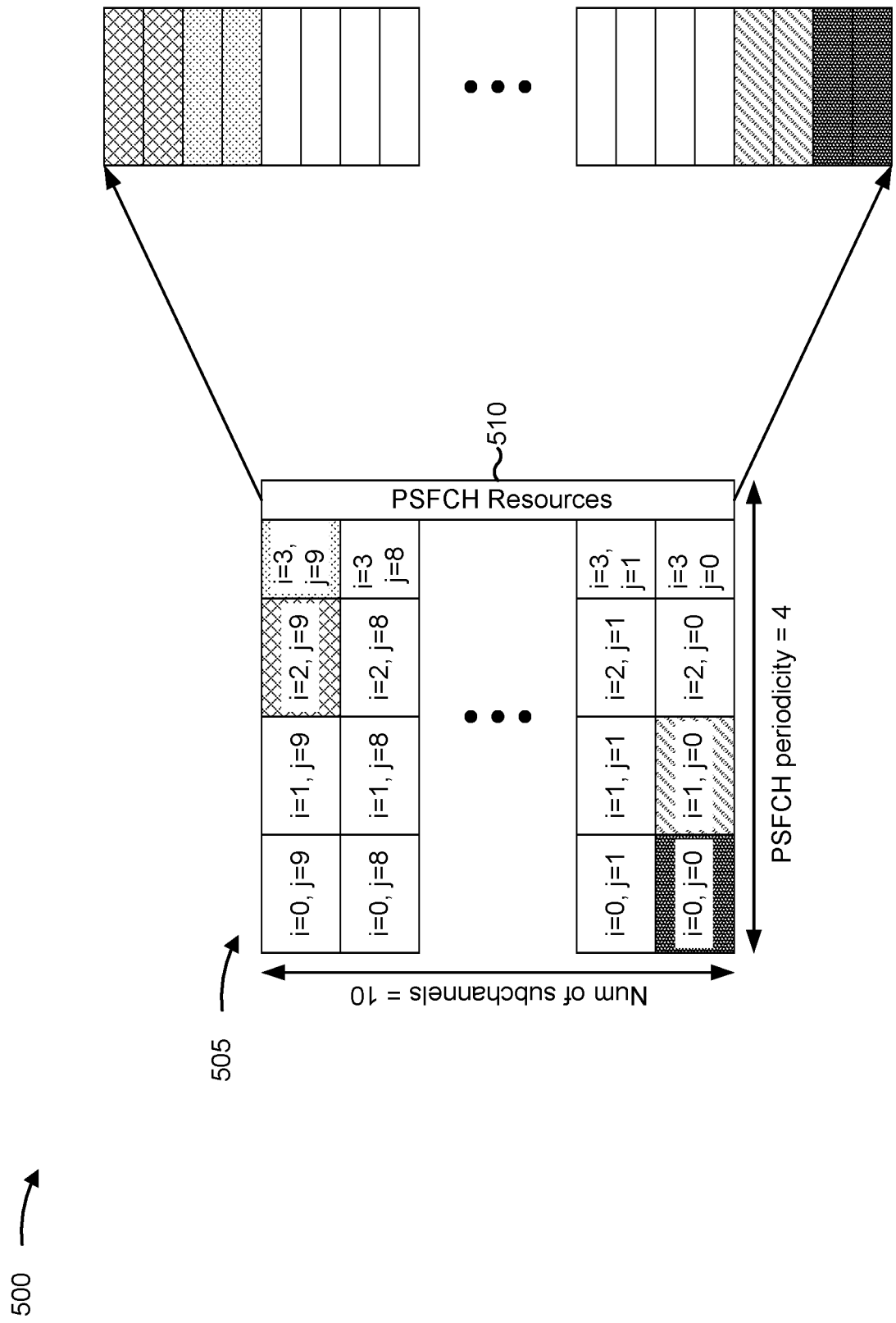
FIG. 5 is a diagram illustrating an example of sidelink feedback channel resource determination, in accordance with various aspects of the present disclosure.

FIG. 5 is a diagram illustrating an example 500 of sidelink feedback channel resource determination, in accordance with various aspects of the present disclosure. FIG. 5 shows a resource pool 505. The resource pool 505 includes 10 subchannels ($N_{subch}=10$), of which four are shown. A subchannel is a frequency-domain subset of a resource pool. A resource pool can be configured with one or more subchannels. In example 500, the resource pool is configured with a physical sidelink feedback channel (PSFCH) periodicity of 4 ($N_{PSSCH}^{PSFCH}=4$). A resource pool can be configured with a PSFCH periodicity, which indicates a periodicity of PSFCH transmissions associated with the resource pool. PSFCH resources 510 indicated by the PSFCH periodicity are in the fourth slot of the resource pool 505.

A UE may allocate a configured number of physical resource blocks (PRBs) for the PSFCH resources 510. In example 500, the UE may allocate 80 PRBs for the PSFCH resources 510 ($M_{PRB,set}^{PSFCH}=80$). A PRB is a group of subcarriers, and may include 12 subcarriers. Since there are 4 slots between each PSFCH resource (due to $N_{PSSCH}^{PSFCH}$) and 10 subchannels in the resource pool (due to $N_{subch}$), each subchannel is associated with 2 of the 80 PSFCH PRBs (e.g., 80 PRBs/(4 slots*10 subchannels)=2 PRBs). In this case, sidelink feedback for a subchannel and slot may be transmitted on 1 of the 2 corresponding PSFCH PRBs. Referring to slot i and subchannel j, as shown in FIG. 5, the UE may allocate the $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH}-1]$ PRBs from $M_{PRB,set}^{PSFCH}$ PRBs to slot i and sub-channel j, where $0 \le i \le N_{PSSCH}^{PSFCH}$ and $0 \le j \le N_{subch}$.

As mentioned above, the PSFCH resources 510 may be used to transmit HARQ feedback regarding PSSCHs received in the resource pool 505. Sidelink HARQ may be sequence-based and may carry a single bit per PSSCH. Sidelink HARQ may be sent on two consecutive symbols (e.g., symbols 11 and 12 of a slot). In some cases, one symbol before and one symbol after a PSFCH occasion are assigned to a gap. A parameter (e.g., periodPSFCHresource) may indicate the PSFCH periodicity, in terms of a number of slots, for a resource pool. The PSFCH periodicity can be set to {0,1,2,4}. If the PSFCH periodicity is set to 0, PSFCH transmissions from a UE in the resource pool are disabled. In example 500, the PSFCH periodicity is set to 4, so PSFCH transmissions are performed in every fourth slot. The UE may transmit the PSFCH in a first slot that includes PSFCH resources and is at least a number of slots, provided by a parameter (e.g., MinTimeGapPSFCH), of the resource pool after a last slot of the PSSCH reception. A parameter (e.g., rbSetPSFCH) may indicate a set and/or a number of $M_{PRB,set}^{PSFCH}$ PRBs in a resource pool for PSFCH transmission. A parameter (e.g., numSubchannel) may indicate a number of $N_{subch}$ subchannels for the resource pool. $N_{PSSCH}^{PSFCH}$ may indicate a number of PSSCH slots associated with a PSFCH slot, which may be determined based at least in part on the parameter periodPSFCHresource described above. In some aspects, $$M_{PRB,set}^{PSFCH} = \alpha \cdot N_{subch} \cdot N_{PSSCH}^{PSFCH} \text{ and } M_{subch,slot}^{PSFCH} = \frac{M_{PRB,set}^{PSFCH}}{N_{subch} \cdot N_{PSSCH}^{PSFCH}}.$$

As indicated above, FIG. 5 is provided as an example. Other examples may differ from what is described with respect to FIG. 5.

A sidelink deployment may support carrier aggregation (CA). In CA, multiple frequency blocks (referred to as component carriers (CCs) or cells) are assigned to a single user. Sidelink CA may improve sidelink throughput relative to a single-carrier configuration. For example, in sidelink CA, a first UE and a second UE may use multiple CCs to communicate with each other. In some examples, sidelink CA may be implemented using a plurality of resource pools. For example, each CC of a sidelink CA configuration may include one or more bandwidth parts (BWPs), and each BWP may include one or more resource pools. In this way, each CC of a sidelink CA configuration may be associated with a respective resource pool or resource pools. The techniques and apparatuses described herein are not limited to those involving respective resource pools for each CC, and can be applied in situations where multiple CCs are configured on a single resource pool, multiple BWPs are configured on a single resource pool, multiple resource pools are configured on a single CC, and/or multiple resource pools are configured on a single BWP, among other examples.

HARQ feedback provides a mechanism for indicating, to a transmitter of a communication, whether the communication was successfully received or not. For example, the transmitter may transmit scheduling information for the communication. A receiver of the scheduling information may monitor resources indicated by the scheduling information in order to receive the communication. If the receiver successfully receives the communication, the receiver may transmit an ACK in HARQ feedback. If the receiver fails to receive the communication, the receiver may transmit a NACK in HARQ feedback. Thus, based at least in part on the HARQ feedback, the transmitter can determine whether the communication should be retransmitted. HARQ feedback is often implemented using a single bit, where a first value of the bit indicates an ACK and a second value of the bit indicates a NACK. Such a bit may be referred to as a HARQ-ACK bit. HARQ-ACK feedback may be conveyed in a HARQ codebook, which may include one or more bits indicating ACKs or NACKs corresponding to one or more communications.

For sidelink CA, HARQ feedback may relate to communications on multiple sidelink CCs. For example, a first UE may transmit HARQ feedback to a second UE regarding multiple PSSCHs on different CCs. As another example, a first UE may transmit HARQ feedback to multiple different UEs regarding PSSCHs received from the multiple different UEs on different CCs.

There are scenarios where a sidelink UE may have difficulty securing channel access, for example, due to a crowded sidelink network, a low priority level of the UE, or the like. If the UE cannot secure channel access, communications of the UE may be negatively impacted. For example, the UE may experience delay in transmitting communications, cancelled communications, failure to satisfy quality of service (QoS) requirements, or the like. One type of communication that can be impacted by delays and cancellations is HARQ feedback. If a receiver UE cannot transmit HARQ feedback in a timely fashion, then a transmitter UE may have difficulty determining whether the transmitter UE's communications were successfully received or not. This may lead to inefficient network resource utilization, unnecessary retransmissions, and negatively impacted user experience.

Some techniques and apparatuses described herein provide triggered HARQ feedback for sidelink UEs using a sidelink CA configuration. For example, some techniques and apparatuses described herein provide triggering of a HARQ feedback transmission using a triggering signal. The triggering signal can be generated by a transmitter UE or by a gNB (and relayed by the transmitter UE, or transmitted by the transmitter UE based at least in part on the triggering signal generated by the gNB). Based at least in part on the triggering signal, a receiver UE may generate and transmit HARQ feedback for a transmitter UE associated with the triggering signal. Some techniques and apparatuses described herein provide configuration or selection between a triggered HARQ feedback scheme (also referred to as a one-shot HARQ feedback scheme), a semi-static HARQ feedback scheme, and a dynamic HARQ feedback scheme, as described in more detail elsewhere herein. In this way, a transmitter UE can trigger HARQ feedback, such as when channel conditions are favorable or when the transmitter UE has failed to receive previous HARQ feedback, which improves network resource utilization, reduces the occurrence of unnecessary retransmissions, and improves user experience.

While many aspects described herein are described with regard to carrier aggregation, these aspects can also be applied for single-carrier deployments.

Figure 6:
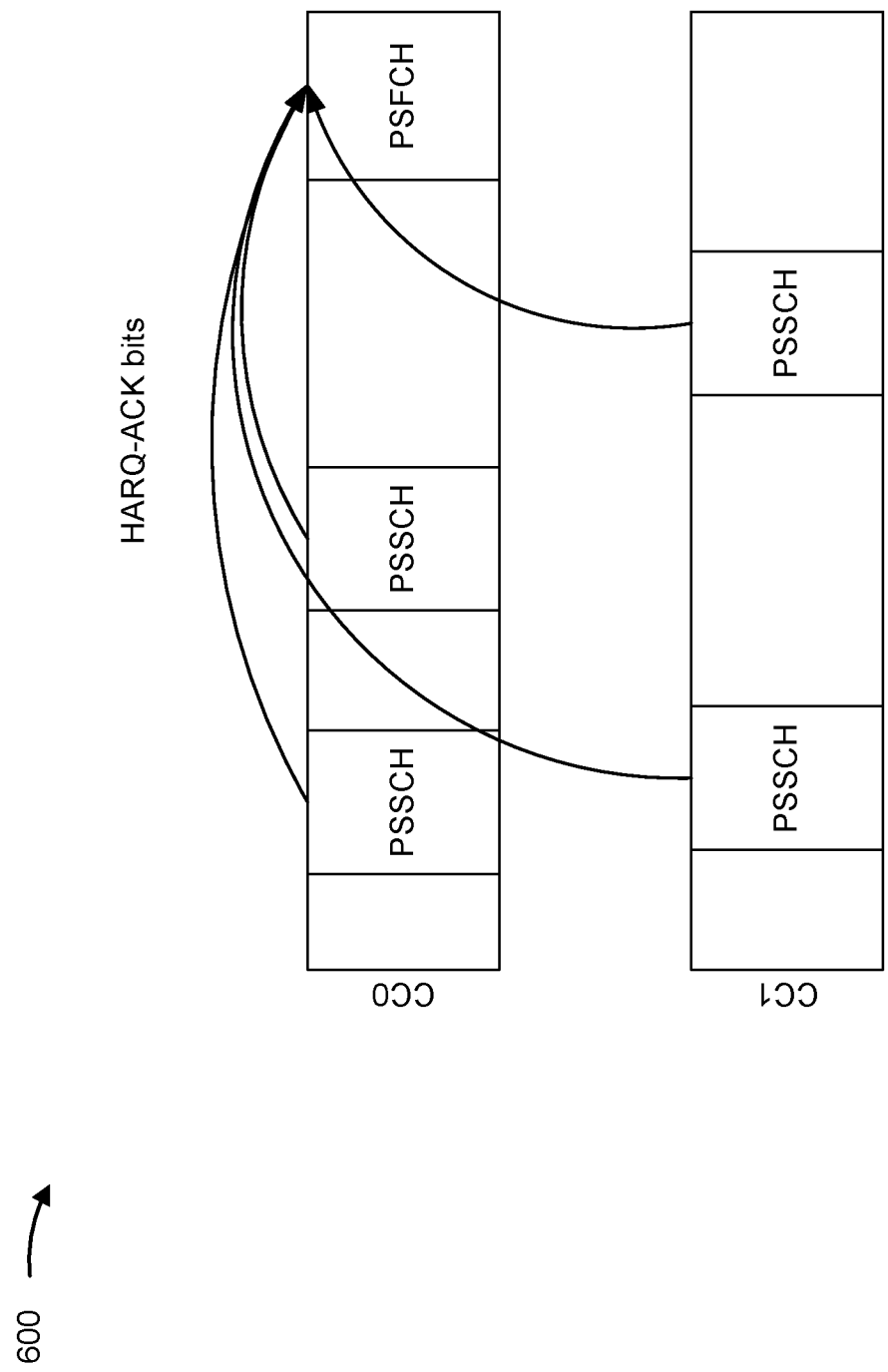
FIG. 6 is a diagram illustrating an example of sidelink feedback for multiple sidelink component carriers, in accordance with various aspects of the present disclosure.

FIG. 6 is a diagram illustrating an example 600 of sidelink feedback for multiple sidelink component carriers, in accordance with various aspects of the present disclosure. Example 600 shows a first CC (CC0) and a second CC (CC1), which are sidelink CCs between a first UE (e.g., a receiver UE) and a second UE (e.g., a transmitter UE). The receiver UE and the transmitter UE are not shown in FIG. 6.

As shown, the first UE may receive, from the second UE, a plurality of PSSCHs. For example, the first UE may receive one or more PSSCHs on the first CC and one or more PSSCHs on the second CC. As indicated by the arrows from the PSSCHs, the UE may provide HARQ feedback regarding the plurality of PSSCHs on a PSFCH transmitted via a designated set of CCs. In example 500, the designated set of CCs includes only CC0, though other examples may include a different CC (e.g., CC1) or multiple CCs (e.g., CC0 and CC1). The HARQ feedback may include a HARQ codebook. In example 600, the HARQ codebook may include four bits: one corresponding to each of the PSSCHs of example 600. Techniques and apparatuses described herein provide for triggered HARQ feedback, and for selection between triggered HARQ feedback, semi-static HARQ feedback, or dynamic HARQ feedback.

As indicated above, FIG. 6 is provided as an example. Other examples may differ from what is described with respect to FIG. 6.

Figure 7:
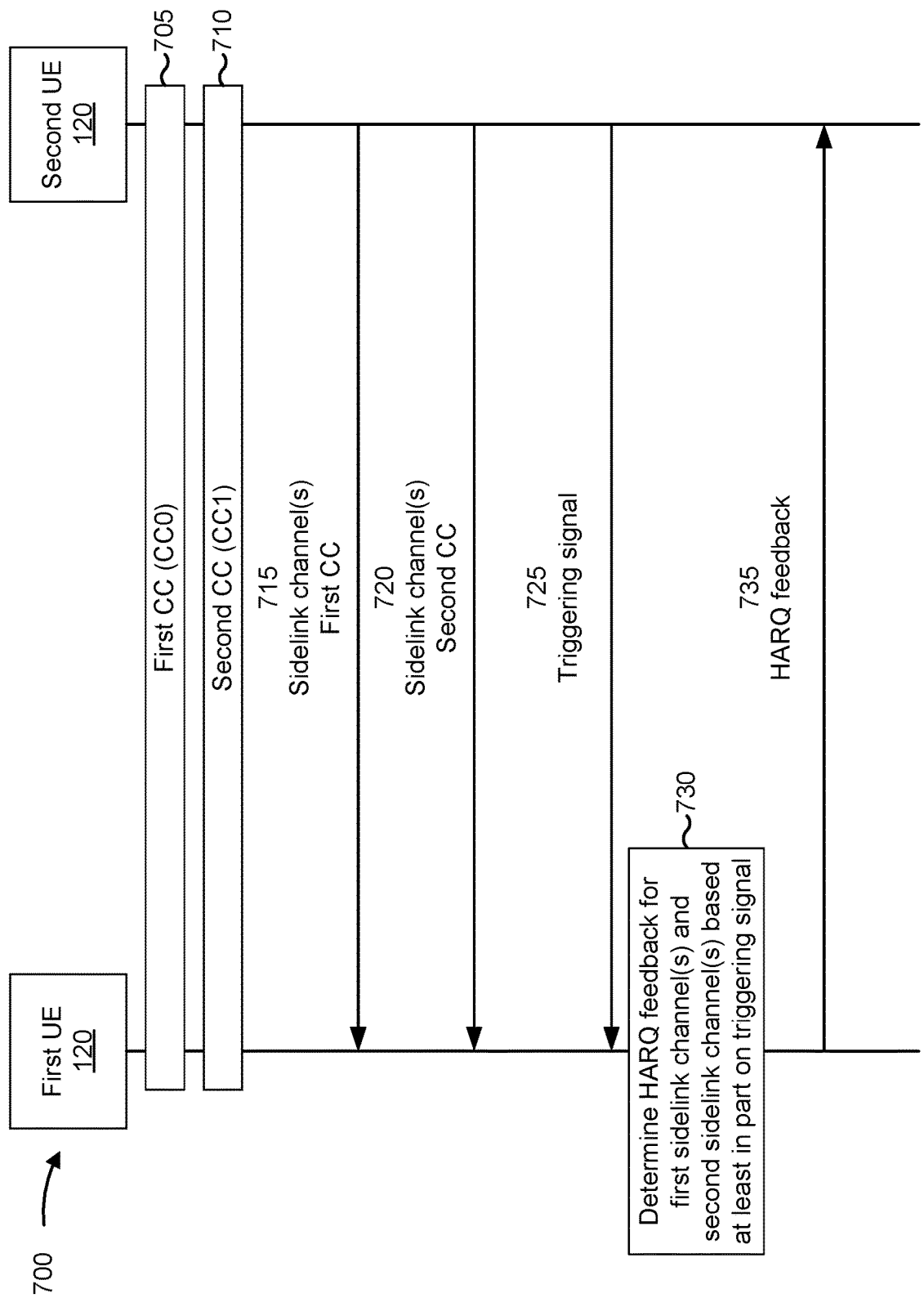
FIG. 7 is a diagram illustrating an example of signaling associated with triggered sidelink feedback for multiple sidelink component carriers, in accordance with various aspects of the present disclosure.

FIG. 7 is a diagram illustrating an example 700 of signaling associated with triggered sidelink feedback for multiple sidelink component carriers, in accordance with various aspects of the present disclosure. As shown, example 700 includes a first UE (e.g., UE 120, UE 305, UE 405/410) and a second UE (e.g., UE 120, UE 305, UE 405/410). In example 700, the first UE is a receiver UE that receives sidelink channels from the second UE. Example 700 is described with regard to a single first UE and a single second UE for clarity. However, there are aspects of the present disclosure that relate to multiple different first UEs and/or multiple different second UEs, and these aspects are described in connection with FIGS. 7-8. While the techniques described herein are primarily described with regard to a CA configuration for sidelink communication, these techniques can also be applied for a sidelink deployment including a single carrier.

As shown by reference number 705, the first UE and the second UE may be associated with a first CC. As shown by reference number 710, the first UE and the second UE may be associated with a second CC. For example, the first CC and the second CC may be part of a CA configuration of the first UE and the second UE. The first CC and the second CC may be sidelink CCs. A sidelink CC is a CC used for communication between UEs, such as via a sidelink. In some aspects, the first CC and the second CC may be implemented using respective resource pools. In some aspects, the first CC and the second CC may be implemented on a single resource pool. The first UE may be associated with a destination UE identifier, and the second UE may be associated with a source UE identifier. In some aspects, the first CC and the second CC may be associated with a unicast communication. In some aspects, the first CC and the second CC may be associated with a groupcast communication. In some aspects, the first CC and the second CC may be associated with a multicast communication. The "traffic cast type" of a link between the first UE and the second UE may indicate whether the link is associated with a unicast communication, a multicast communication, or a groupcast communication. Furthermore, the first UE and the second UE may be said to be associated with a session. The session may include the first CC and the second CC and may be identified by at least the source UE identifier and the destination UE identifier.

As shown by reference number 715, the first UE may receive, from the second UE, one or more first sidelink channels on the first CC. As shown by reference number 720, the first UE may receive, from the second UE, one or more second sidelink channels on the second CC. In some aspects, the one or more first sidelink channels and/or the one or more second sidelink channels may be PSSCHs. In some aspects, the first UE may receive a sidelink channel on only one of the first CC and the second CC. In some aspects, the first UE may fail to receive one or more of the sidelink channels shown in example 700.

As shown by reference number 725, the first UE may receive, from the second UE, a triggering signal. The first UE may receive the triggering signal via a sidelink interface. The triggering signal may trigger the first UE to generate HARQ feedback for a sidelink between the first UE and the second UE. For example, the triggering signal may trigger the HARQ feedback. In some aspects, the second UE may trigger the HARQ feedback for a particular UE (in this case, the first UE). In some aspects, the second UE may relay the triggering signal from a gNB. For example, the gNB may use a downlink control information (DCI) format, such as a DCI format specific to triggering the second UE to transmit the triggering signal (e.g., DCI Format 3_X, where X is an integer), to transmit DCI that causes the second UE to transmit the triggering signal. In some aspects, the second UE may transmit the triggering signal via sidelink control information (SCI). For example, the SCI may include a bit indicating that the SCI includes or is a triggering signal. In some aspects, the SCI may use a format specific to triggering signals.

In some aspects, the second UE may schedule data transmission in association with a triggering signal. For example, the PSCCH that carries the SCI that conveys the triggering signal may also schedule data transmission in a PSSCH corresponding to the PSCCH. If the PSCCH does not schedule the data transmission, and if the trigger is conveyed in SCI-2, then an entire slot in which the SCI-2 is received may be dedicated to the SCI-2.

In some aspects, the second UE may indicate a PSFCH resource for the HARQ feedback. For example, the second UE may indicate the PSFCH resource via information included in the triggering signal, by configuring the UE, by configuring a resource pool associated with the triggering signal, or the like. In some aspects, the indication of the PSFCH resource may be associated with a timeline. For example, the first UE may be expected to comply with the indication of the PSFCH resources only if there is at least a threshold length of time (defined in slots, symbols, or the like) between the triggering signal and the PSFCH resources. The threshold length of time can be based at least in part on a network configuration, a capability of the first UE (which can be signaled by the first UE in capability information), a wireless communication specification, a pre-configuration (e.g., in accordance with a wireless communication specification), or the like.

In some aspects, the first UE may transmit the HARQ feedback to the second UE on a PSSCH. In such a case, the first UE may include, in a transmission on the PSSCH, a flag indicating whether the PSSCH includes HARQ feedback. This may be beneficial to the triggering UE (e.g., the second UE) since there are situations in which the triggering UE may not be certain whether a PSSCH includes HARQ feedback. For example, the first UE may transmit a PSSCH to the second UE before the first UE has decoded the PSCCH or PSSCH triggering the HARQ feedback. As another example, a first UE may have higher-priority packets (e.g., more important packets) to transmit before the HARQ feedback.

As shown by reference number 730, the first UE may determine HARQ feedback for the one or more first sidelink channels and the one or more second sidelink channels based at least in part on the triggering signal. For example, the first UE may generate HARQ feedback regarding all sidelink HARQ processes associated with a source UE identifier associated with the triggering signal. For example, the first UE may generate HARQ feedback regarding all sidelink HARQ processes associated with the second UE (e.g., the UE that triggered the HARQ reporting) for each sidelink CC between the first UE and the second UE. For example, a UE1 might have sidelink communication with UE2 on CC0 and CC1 and with UE3 on CC2 and CC3 (not shown in FIG. 7). If UE2 triggers reporting for UE1, UE1 may only generate HARQ feedback for sidelink HARQ processes with UE2 and for CC0 and CC1.

In some aspects, the triggering signal may be applied to a subset of CCs. For example, the trigger may indicate indexes corresponding to the subset of CCs. As another example, the first UE may determine the subset of CCs. For example, if UE1 and UE2 have 4 SL CCs aggregated, and CC0 is used as a SL HARQ CC for CC0 and CC1 and CC2 is used as SL HARQ CC for CC2 and CC3, then if the trigger is received on CC0 or CC1, HARQ-ACK for all HARQ processes associated with these two carriers only may be reported.

A HARQ process may correspond to a PSSCH or another communication for which HARQ feedback is to be provided. A HARQ identifier may indicate a sidelink HARQ process associated with a PSSCH or another communication and may enable the first UE and the second UE to identify the communication corresponding to a HARQ-ACK bit. A transmitter UE may cycle through a number of HARQ process identifiers corresponding to a number of HARQ processes as the transmitter UE transmits communications. The first UE may track and report HARQ feedback for the number of HARQ process identifiers.

As shown by reference number 735, the first UE may transmit the HARQ feedback. For example, the first UE may transmit the HARQ feedback on a PSFCH resource indicated by the second UE, on a PSSCH, on a dedicated set of CCs, or the like. Thus, the second UE may trigger, and the first UE may provide, triggered HARQ feedback (e.g., one-shot HARQ feedback).

In some aspects, the first UE and/or the second UE may be capable of generating and/or interpreting multiple different types of HARQ feedback, such as triggered HARQ feedback, semi-static HARQ feedback, dynamic HARQ feedback, or the like. A semi-static HARQ codebook includes HARQ-ACK bits corresponding to "potential" PSSCH occasions per slot. For example, if a PSFCH is to be transmitted in slot n, the UE may generate HARQ-ACK bits for a set of slots, in the past, for which a slot offset (e.g., K1) can point to slot N. The slot offset K1 may indicate a number of slots between a PSSCH and a PSFCH that carries HARQ feedback relating to the PSSCH. Since different PSSCHs can be associated with different slot offsets (in some aspects), the PSFCH can carry HARQ feedback for multiple PSSCHs.

Pseudo-code for determining a semi-static HARQ codebook is provided below by way of example only:

---

Input: set of time-domain resource allocation (TDRA) candidates R
1> Initialize PSSCH occasion index = j
1> If UE can only receive 1 PSSCH in a slot
   2> Determine 1 PSSCH occasion per slot; add PSSCH occasion j into set $M_{A,c}$
1> Else
   2> While R ≠ ∅
      3> Set m to be smallest last orthogonal frequency division multiplexing (OFDM) symbol index for all TDRA candidates in R
      3> Loop over all TDRA candidates r in R
         4> if candidate starts no later than OFDM symbol m
            5> Put the TDRA candidate into group j
            5> Remove TDRA candidate r from R
         4> End if
      3> End Loop
      3> j = j + 1; add PSSCH occasion j into set $M_{A,c}$
   2> End while

---

In some aspects, in the sidelink, the first UE can receive only a single PSSCH from one other UE in a given slot. Thus, the first part of the pseudocode (e.g., 1> If UE can only receive 1 PSSCH in a slot; 2> Determine 1 PSSCH occasion per slot; add PSSCH occasion j into set $M_{A,c}$) may be used to determine the HARQ codebook.

A dynamic HARQ codebook is a HARQ codebook that is determined based at least in part on PSCCH monitoring occasions and/or sidelink assignment indicators (SAIs). A PSCCH monitoring occasion is a set of resources that a UE may monitor for a PSSCH. A PSSCH monitoring occasion may be determined based at least in part on slot offsets between a PSSCH and a corresponding PSFCH (e.g., K1) and slot offsets between a PSCCH and a corresponding PSSCH (e.g., K0). A PSSCH monitoring occasion is counted only in the time domain, meaning that a PSSCH monitoring occasion can span multiple CCs (if PSSCH monitoring resources on the multiple CCs are aligned with each other in time). An SAI may be conveyed via SCI. An SAI may include a counter SAI (sometimes abbreviated cSAI) and a total SAI (sometimes abbreviated tSAI). Generally, the cSAI and the tSAI can be used to determine how many SCIs (and thus how many scheduled PSSCHs) were transmitted to the first UE. The first UE may use the SAIs conveyed via SCIs from the second UE to determine how many HARQ-ACK bits should be included in a PSFCH.

In some aspects, the first UE may receive information indication whether to provide triggered HARQ feedback (e.g., using a Type 3 HARQ codebook), semi-static HARQ feedback (e.g., using a Type 1 HARQ codebook), or dynamic HARQ feedback (e.g., using a Type 2 HARQ codebook). For example, the first UE may be configured to report HARQ feedback based at least in part on a semi-static HARQ feedback scheme or a dynamic HARQ feedback scheme. In some aspects, the first UE may be configured to report triggered HARQ feedback upon receiving a triggering signal, in addition to being configured to provide semi-static HARQ feedback or dynamic HARQ feedback (e.g., in accordance with a PSFCH periodicity). In other words, the Type 3 codebook needs not be a standalone mode of operation and can be supported in conjunction with other HARQ-ACK codebook types.

In some aspects, the first UE may be configured to provide different HARQ codebook types (e.g., triggered HARQ feedback, semi-static HARQ feedback, or dynamic HARQ feedback). For example, a HARQ codebook type may be configured for a resource pool (e.g., per resource pool), for a sidelink carrier (e.g., per sidelink carrier for a sidelink bandwidth part), for a BWP, for a traffic cast type (e.g., per traffic cast type), or for a zone identifier (e.g., per zone identifier). A zone identifier may indicate a location of the first UE or a zone in which the first UE is located. In some aspects, the HARQ codebook type may be preconfigured for a resource pool (e.g., per resource pool), for a sidelink carrier (e.g., per sidelink carrier for a sidelink bandwidth part), for a BWP, for a traffic cast type (e.g., per traffic cast type), or for a zone identifier (e.g., per zone identifier).

In some aspects, the first UE may generate multiple HARQ codebooks (e.g., in response to a triggering signal or independently of a triggering signal). For example, the first UE may generate one HARQ codebook per unicast link and one HARQ codebook per groupcast link (equivalently, one HARQ codebook per source UE identifier) independently. For example, a UE1 may have unicast links with a UE2 and a UE3. In case the transmissions are HARQ-based, the UE1 may generate one codebook for PSSCHs received from UE2 and one codebook for PSSCHs received from UE3. As another example, a UE may be capable of simultaneously generating 2 codebooks, and the UE may be engaged in one unicast session and one groupcast session, which both require HARQ feedback. If there is a request from another UE for PC5 link establishment for traffic that requires feedback, the UE can avoid setting up the link (e.g., since the UE can only simultaneously generate 2 codebooks and the UE is already associated with 2 sessions. The number of sidelink codebooks a UE can simultaneously generate may be reported as a UE capability, for example, to peer UEs in the sidelink network and/or to a network or gNB.

As indicated above, FIG. 7 is provided as an example. Other examples may differ from what is described with respect to FIG. 7.

Figure 8:
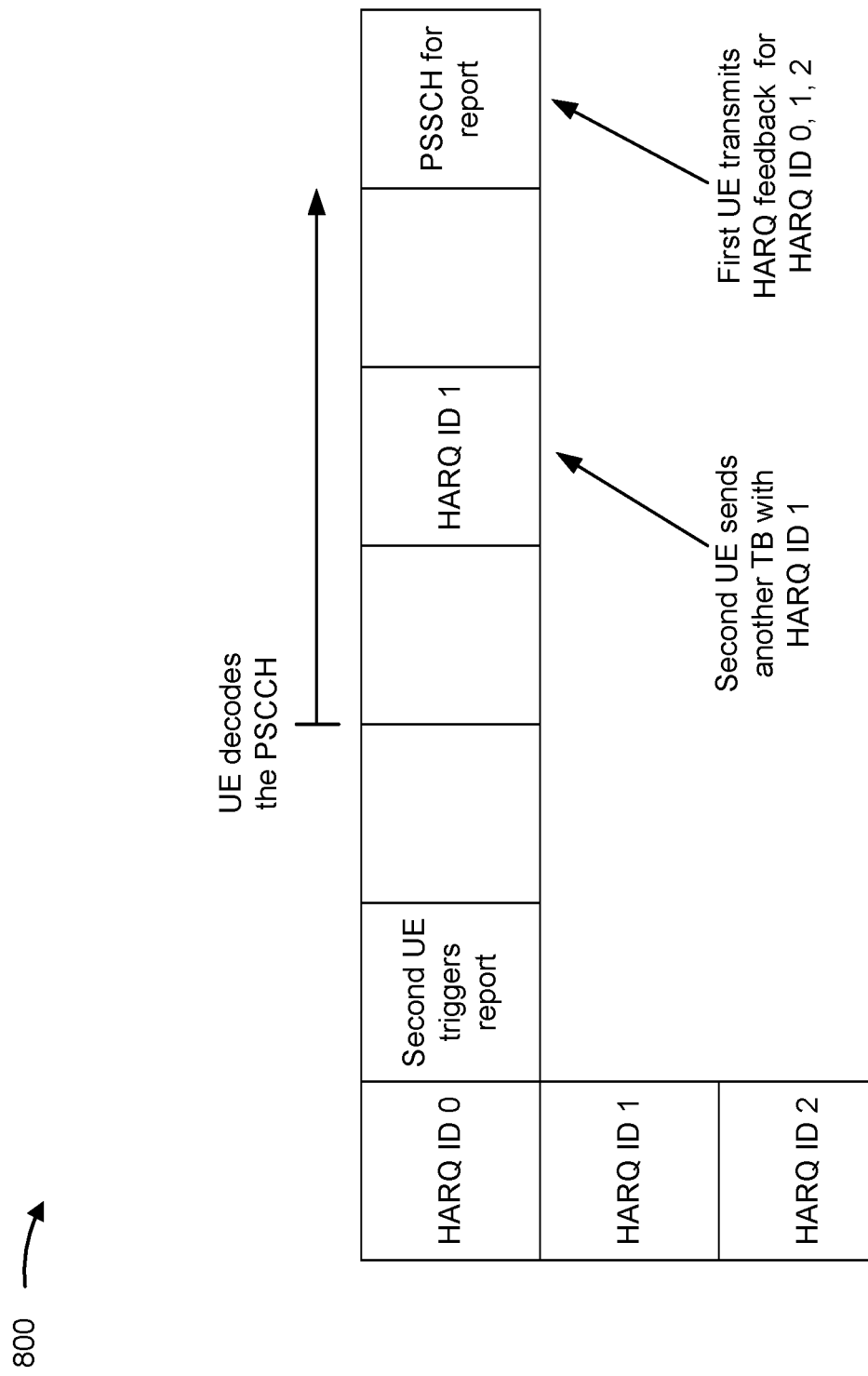
FIG. 8 is a diagram illustrating an example of timing associated with a triggering signal for sidelink feedback, in accordance with various aspects of the present disclosure.

FIG. 8 is a diagram illustrating an example 800 of timing associated with a triggering signal for sidelink feedback, in accordance with various aspects of the present disclosure. In example 800, a first UE receives, in a first slot, communications associated with HARQ identifiers of 0, 1, and 2. A HARQ identifier may indicate a HARQ process associated with a PSSCH or another transmission and may enable the first UE and the second UE to identify the communication corresponding to a HARQ-ACK bit. A transmitter UE may cycle through a number of HARQ process identifiers. The first UE may track and report HARQ feedback for a plurality of HARQ process identifiers.

In example 800, each block represents a slot, and a vertical stack of blocks represents multiple receptions in a slot. As shown, in a second slot, a second UE may trigger HARQ feedback, for example, by transmitting a triggering signal to the first UE. As shown, the first UE may decode the PSCCH in a third slot or a fourth slot. Subsequently, in a fifth slot, the second UE may transmit another TB associated with HARQ identifier 1. Thus, the UE receives a TB after the HARQ feedback has been triggered and before the HARQ feedback has been transmitted. After the PSCCH has been decoded, the first UE may identify PSSCHs to be indicated in the report and may transmit the report on a PSSCH in a seventh slot (or in a PSFCH).

In some aspects, the first UE may only report HARQ feedback considering the state of each HARQ process up to (e.g., before and including) a given slot in which the triggering signal is received (in example 800, the second slot). In this example, the first UE may disregard the transmission in the fifth slot for the purpose of generating HARQ feedback. In this case, even if the second UE transmits another communication (e.g., the TB in the fifth slot), the second UE may be aware that the first UE will not update a HARQ-ACK bit for a HARQ process corresponding to the communication if the communication occurs after the triggering signal is received, so there is no ambiguity.

In some aspects, a first UE can update the HARQ value for a given HARQ process in case the first UE receives a new transmission for the given HARQ process after the HARQ feedback is triggered. However, to ensure that a first UE has sufficient time to process the PSCCH/PSSCH and update the HARQ codebook, a deadline before the transmission of the HARQ codebook may be defined (e.g., in terms of slots or the like). Once the deadline is known to the second UE, the second UE can determine whether a HARQ codebook is updated or not with regard to a transmission after a triggering signal. Hence, there will be no ambiguity.

As indicated above, FIG. 8 is provided as an example. Other examples may differ from what is described with regard to FIG. 8.

Figure 9:
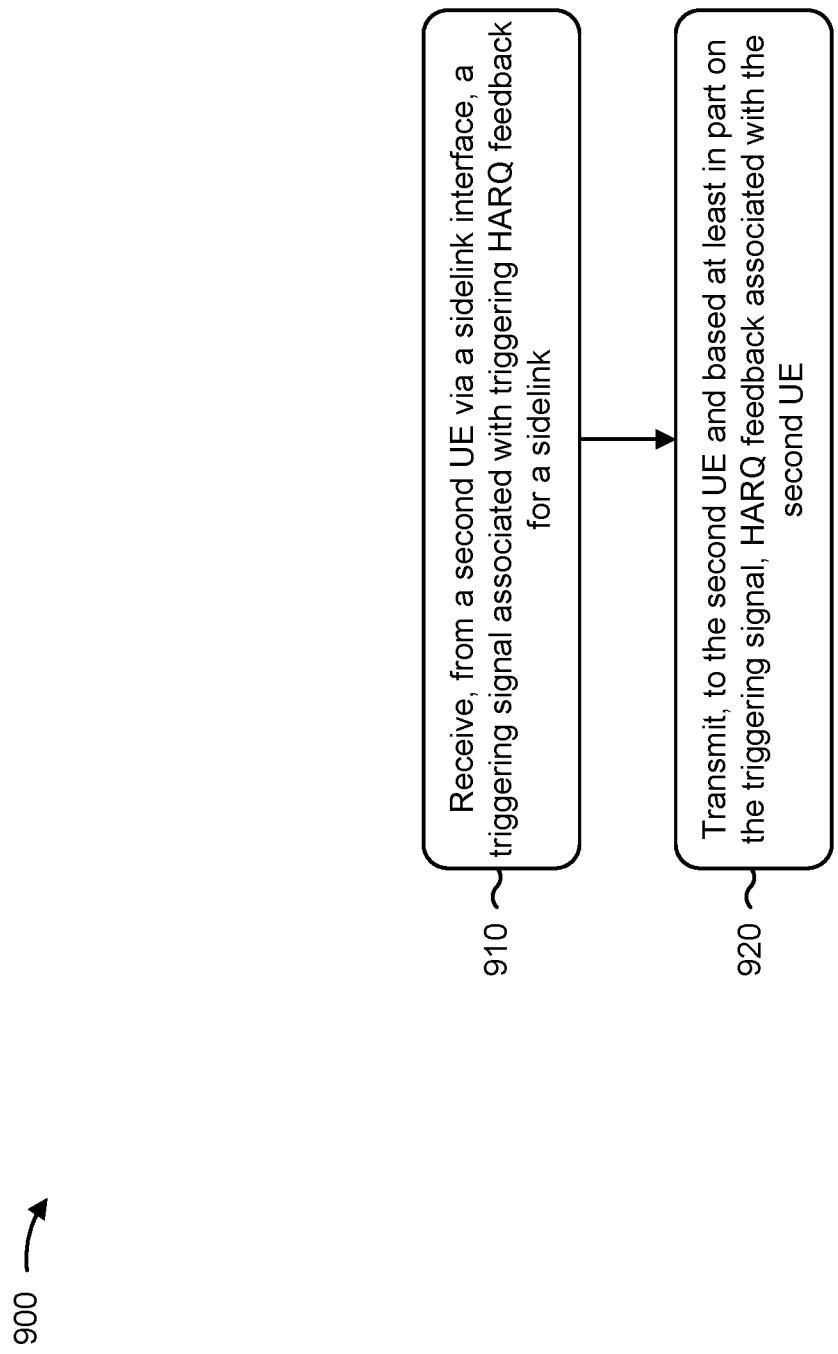
FIGS. 9-10 are diagrams illustrating example processes associated with hybrid automatic repeat request (HARQ) codebook design for a sidelink, in accordance with various aspects of the present disclosure.

FIG. 9 is a diagram illustrating an example process 900 performed, for example, by a first UE in accordance with various aspects of the present disclosure. Example process 900 is an example where the UE (e.g., UE 120, UE 305, UE 405/410) performs operations associated with HARQ codebook design.

As shown in FIG. 9, in some aspects, process 900 may include receiving, from a second UE via a sidelink interface, a triggering signal associated with triggering HARQ feedback for a sidelink (block 910). For example, the UE (e.g., using reception component 1102, depicted in FIG. 11) may receive, from a second UE via a sidelink interface, a triggering signal associated with triggering HARQ feedback for a sidelink, as described above.

As further shown in FIG. 9, in some aspects, process 900 may include transmitting, to the second UE and based at least in part on the triggering signal, HARQ feedback associated with the second UE (block 920). For example, the UE (e.g., using transmission component 1104, depicted in FIG. 11) may transmit, to the second UE and based at least in part on the triggering signal, HARQ feedback associated with the second UE, as described above.

Process 900 may include additional aspects, such as any single aspect or any combination of aspects described below and/or in connection with one or more other processes described elsewhere herein.

In a first aspect, the first UE and the second UE are associated with a carrier aggregation configuration, and wherein the HARQ feedback relates to a plurality of carriers of the carrier aggregation configuration.

In a second aspect, alone or in combination with the first aspect, the triggering signal includes sidelink control information.

In a third aspect, alone or in combination with one or more of the first and second aspects, the triggering signal is received via a sidelink control channel, and wherein the sidelink control channel schedules a data transmission in a corresponding sidelink shared channel.

In a fourth aspect, alone or in combination with one or more of the first through third aspects, the triggering signal is received via a sidelink control channel, wherein the sidelink control channel does not schedule a data transmission in a corresponding sidelink shared channel, and wherein a slot including the sidelink control channel is allocated entirely for the sidelink control channel.

In a fifth aspect, alone or in combination with one or more of the first through fourth aspects, the triggering signal is associated with information indicating a feedback resource for the HARQ feedback, and wherein the HARQ feedback is transmitted on the feedback resource.

In a sixth aspect, alone or in combination with one or more of the first through fifth aspects, the HARQ feedback is transmitted via a sidelink shared channel.

In a seventh aspect, alone or in combination with one or more of the first through sixth aspects, the HARQ feedback relates to each sidelink HARQ process associated with a source identifier of the second UE and to each carrier between the first UE and the second UE.

In an eighth aspect, alone or in combination with one or more of the first through seventh aspects, the triggering signal is received in a given slot, and wherein the HARQ feedback includes feedback only regarding slots before the given slot and to the given slot.

In a ninth aspect, alone or in combination with one or more of the first through eighth aspects, the triggering signal is received in a given slot, and wherein the HARQ feedback includes feedback regarding a slot after the given slot based at least in part on a feedback deadline.

In a tenth aspect, alone or in combination with one or more of the first through ninth aspects, the HARQ feedback is provided in a communication that includes a flag indicating that the communication includes the HARQ feedback.

In an eleventh aspect, alone or in combination with one or more of the first through tenth aspects, the HARQ feedback is based at least in part on the triggering signal, wherein the HARQ feedback is one-shot HARQ feedback, and wherein the method further comprises receiving information indicating whether to provide at least one of the one-shot HARQ feedback, semi-static HARQ feedback, or dynamic HARQ feedback.

In a twelfth aspect, alone or in combination with one or more of the first through eleventh aspects, the received information is specific to at least one of a resource pool, a sidelink carrier, a sidelink BWP, a traffic cast type, or a zone identifier.

In a thirteenth aspect, alone or in combination with one or more of the first through twelfth aspects, the HARQ feedback includes one HARQ codebook per unicast link of the first UE and one HARQ codebook per groupcast link of the first UE.

In a fourteenth aspect, alone or in combination with one or more of the first through thirteenth aspects, the HARQ feedback includes one HARQ codebook per source identifier of the first UE.

In a fifteenth aspect, alone or in combination with one or more of the first through fourteenth aspects, process 900 includes transmitting information indicating a number of HARQ codebooks that the first UE is capable of simultaneously generating, wherein the HARQ feedback is based at least in part on the number of HARQ codebooks.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
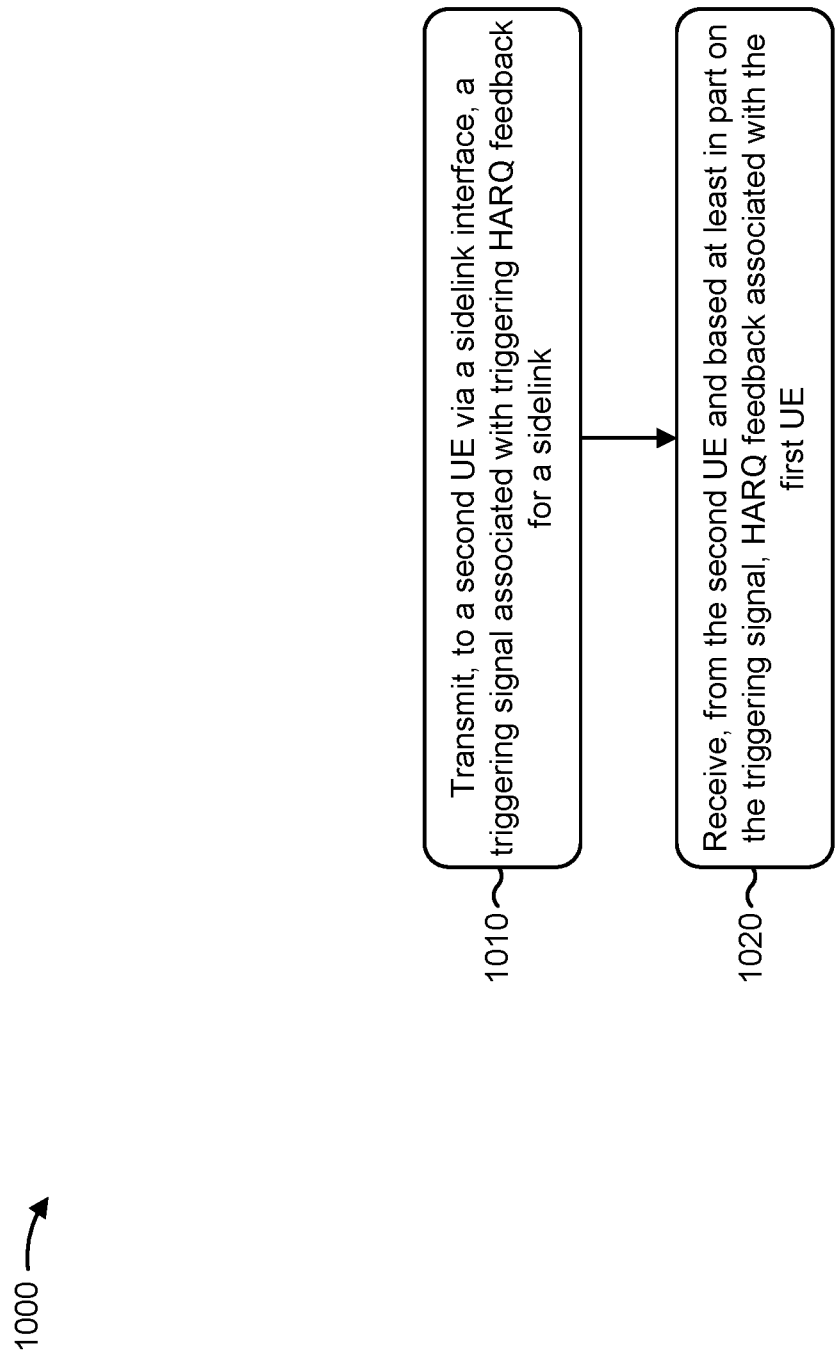

FIG. 10 is a diagram illustrating an example process 1000 performed, for example, by an UE, in accordance with various aspects of the present disclosure. Example process 1000 is an example where the UE (e.g., UE 120) performs operations associated with hybrid automatic repeat request codebook design.

As shown in FIG. 10, in some aspects, process 1000 may include transmitting, to a second UE via a sidelink interface, a triggering signal associated with triggering HARQ feedback for a sidelink (block 1010). For example, the UE (e.g., using transmission component 1204, depicted in FIG. 12) may transmit, to a second UE via a sidelink interface, a triggering signal associated with triggering HARQ feedback for a sidelink, as described above.

As further shown in FIG. 10, in some aspects, process 1000 may include receiving, from the second UE and based at least in part on the triggering signal, HARQ feedback associated with the first UE (block 1020). For example, the UE (e.g., using reception component 1202, depicted in FIG. 12) may receive, from the second UE and based at least in part on the triggering signal, HARQ feedback associated with the first UE, as described above.

Process 1000 may include additional aspects, such as any single aspect or any combination of aspects described below and/or in connection with one or more other processes described elsewhere herein.

In a first aspect, the first UE and the second UE are associated with a carrier aggregation configuration, and wherein the HARQ feedback relates to a plurality of carriers of the carrier aggregation configuration.

In a second aspect, alone or in combination with the first aspect, the triggering signal is relayed via the first UE from a base station.

In a third aspect, alone or in combination with one or more of the first and second aspects, the triggering signal is transmitted via a sidelink control channel, wherein the sidelink control channel does not schedule a data transmission in a corresponding sidelink shared channel, and wherein a slot including the sidelink control channel is allocated entirely for the sidelink control channel.

In a fourth aspect, alone or in combination with one or more of the first through third aspects, the triggering signal is associated with information indicating a feedback resource for the HARQ feedback, and wherein the HARQ feedback is transmitted on the feedback resource.

In a fifth aspect, alone or in combination with one or more of the first through fourth aspects, the HARQ feedback relates to each sidelink HARQ process associated with a source identifier of the first UE and to each carrier between the first UE and the second UE.

In a sixth aspect, alone or in combination with one or more of the first through fifth aspects, the triggering signal is transmitted in a given slot, and wherein the HARQ feedback includes feedback only regarding slots before the given slot and the given slot.

In a seventh aspect, alone or in combination with one or more of the first through sixth aspects, the triggering signal is transmitted in a given slot, and wherein the HARQ feedback includes feedback regarding a slot after the given slot based at least in part on a feedback deadline.

In an eighth aspect, alone or in combination with one or more of the first through seventh aspects, the HARQ feedback is received in a communication that includes a flag indicating that the communication includes the HARQ feedback.

In a ninth aspect, alone or in combination with one or more of the first through eighth aspects, the HARQ feedback is based at least in part on the triggering signal, wherein the HARQ feedback is one-shot HARQ feedback, and wherein the method further comprises transmitting information indicating whether to provide at least one of the one-shot HARQ feedback, semi-static HARQ feedback, or dynamic HARQ feedback.

In a tenth aspect, alone or in combination with one or more of the first through ninth aspects, the HARQ feedback includes one HARQ codebook per unicast link of the first UE and one HARQ codebook per groupcast link of the first UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
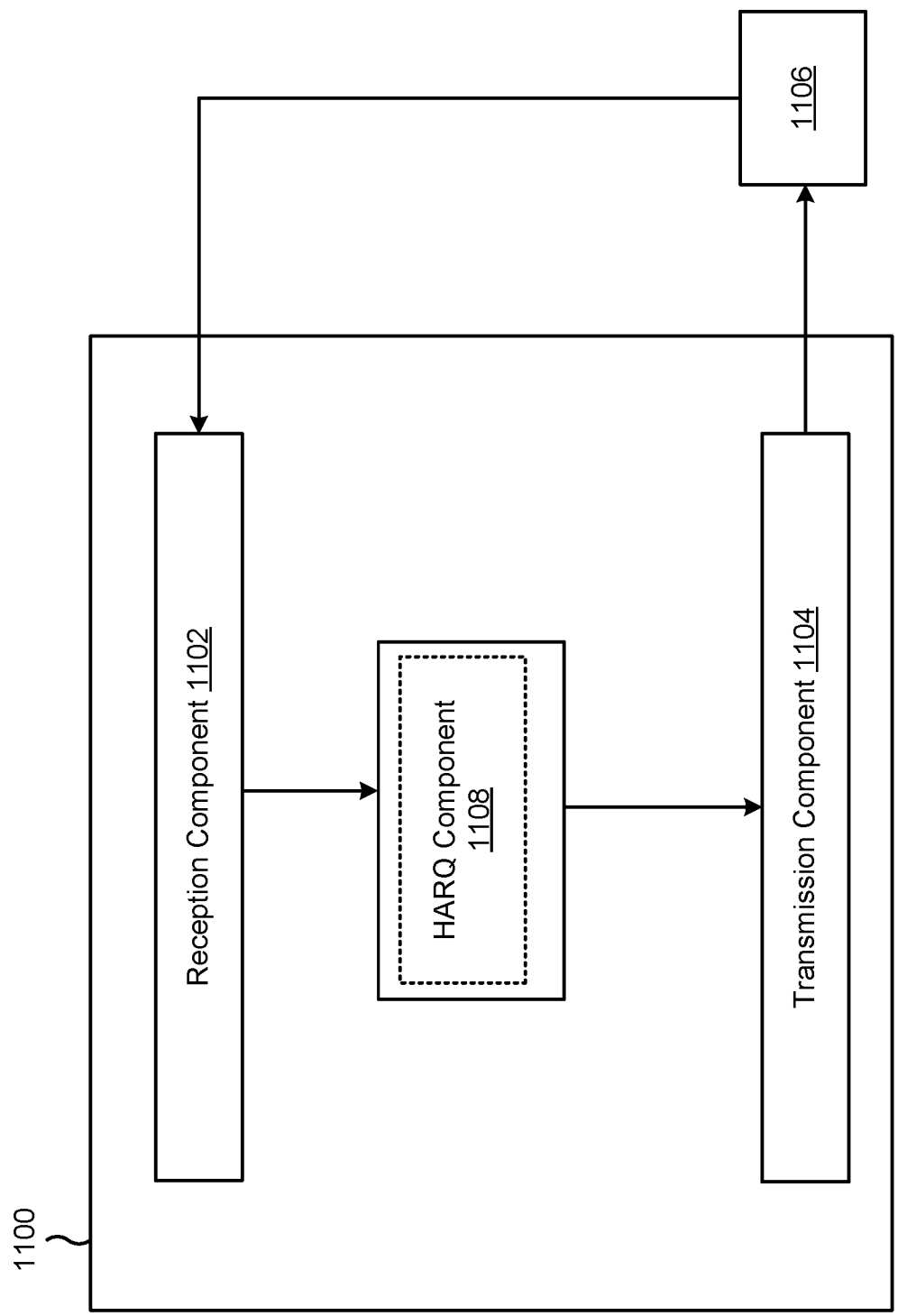
FIGS. 11-12 are block diagrams of example apparatuses for wireless communication, in accordance with various aspects of the present disclosure.

FIG. 11 is a block diagram of an example apparatus 1100 for wireless communication. The apparatus 1100 may be a first UE, or a first UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a HARQ component 1108, among other examples.

In some aspects, the apparatus 1100 may be configured to perform one or more operations described herein in connection with FIGS. 3-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the first UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the first UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the first UE described above in connection with FIG. 2. In some aspects, the transmission component 1104 may be co-located with the reception component 1102 in a transceiver.

The reception component 1102 may receive, from a second UE via a sidelink interface, a triggering signal associated with triggering HARQ feedback for a sidelink. The transmission component 1104 may transmit, to the second UE and based at least in part on the triggering signal, HARQ feedback associated with the second UE. The HARQ component 1108 may generate the HARQ feedback associated with the second UE.

The transmission component 1104 may transmit information indicating a number of HARQ codebooks that the first UE is capable of simultaneously generating, wherein the HARQ feedback is based at least in part on the number of HARQ codebooks.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
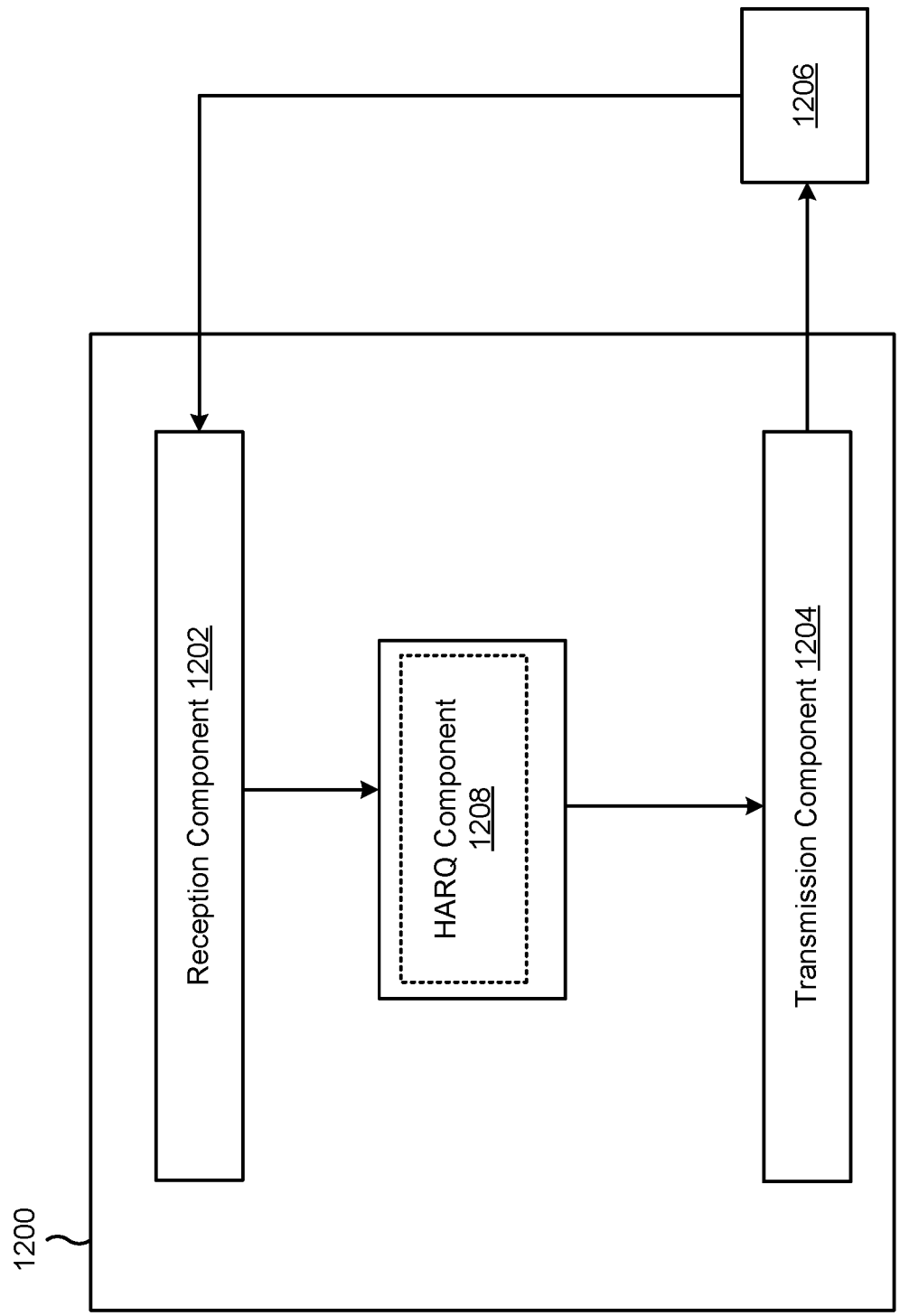

FIG. 12 is a block diagram of an example apparatus 1200 for wireless communication. The apparatus 1200 may be a first UE, or a first UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a HARQ component 1208, among other examples.

In some aspects, the apparatus 1200 may be configured to perform one or more operations described herein in connection with FIGS. 3-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the first UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the first UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the first UE described above in connection with FIG. 2. In some aspects, the transmission component 1204 may be co-located with the reception component 1202 in a transceiver.

The transmission component 1204 may transmit, to a second UE via a sidelink interface, a triggering signal associated with triggering HARQ feedback for a sidelink. The reception component 1202 may receive, from the second UE and based at least in part on the triggering signal, HARQ feedback associated with the first UE. The HARQ component 1208 may cause the apparatus 1200 to transmit the triggering signal, and/or may interpret the HARQ feedback associated with the first UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of aspects of the present disclosure:

Aspect 1: A method of wireless communication performed by a first user equipment (UE), comprising: receiving, from a second UE via a sidelink interface, a triggering signal associated with triggering hybrid automatic repeat request (HARQ) feedback for a sidelink; and transmitting, to the second UE and based at least in part on the triggering signal, HARQ feedback associated with the second UE.

Aspect 2: The method of aspect 1, wherein the first UE and the second UE are associated with a carrier aggregation configuration, and wherein the HARQ feedback relates to a plurality of carriers of the carrier aggregation configuration.

Aspect 3: The method of any of aspects 1-2, wherein the triggering signal includes sidelink control information.

Aspect 4: The method of any of aspects 1-3, wherein the triggering signal is received via a sidelink control channel, and wherein the sidelink control channel schedules a data transmission in a corresponding sidelink shared channel.

Aspect 5: The method of any of aspects 1-3, wherein the triggering signal is received via a sidelink control channel, wherein the sidelink control channel does not schedule a data transmission in a corresponding sidelink shared channel, and wherein a slot including the sidelink control channel is allocated entirely for the sidelink control channel.

Aspect 6: The method of any of aspects 1-5, wherein the triggering signal is associated with information indicating a feedback resource for the HARQ feedback, and wherein the HARQ feedback is transmitted on the feedback resource.

Aspect 7: The method of any of aspects 1-6, wherein the HARQ feedback is transmitted via a sidelink shared channel.

Aspect 8: The method of any of aspects 1-7, wherein the HARQ feedback relates to each sidelink HARQ process associated with a source identifier of the second UE and to each carrier between the first UE and the second UE.

Aspect 9: The method of any of aspects 1-8, wherein the triggering signal is received in a given slot, and wherein the HARQ feedback includes feedback only regarding slots before the given slot and to the given slot.

Aspect 10: The method of any of aspects 1-8, wherein the triggering signal is received in a given slot, and wherein the HARQ feedback includes feedback regarding a slot after the given slot based at least in part on a feedback deadline.

Aspect 11: The method of any of aspects 1-10, wherein the HARQ feedback is provided in a communication that includes a flag indicating that the communication includes the HARQ feedback.

Aspect 12: The method of any of aspects 1-11, wherein the HARQ feedback is based at least in part on the triggering signal, wherein the HARQ feedback is one-shot HARQ feedback, and wherein the method further comprises: receiving information indicating whether to provide at least one of the one-shot HARQ feedback, semi-static HARQ feedback, or dynamic HARQ feedback.

Aspect 13: The method of any of aspects 1-12, wherein the received information is specific to at least one of: a resource pool, a sidelink carrier, a sidelink BWP, a traffic cast type, or a zone identifier.

Aspect 14: The method of any of aspects 1-13, wherein the HARQ feedback includes one HARQ codebook per unicast link of the first UE and one HARQ codebook per groupcast link of the first UE.

Aspect 15: The method of any of aspects 1-14, wherein the HARQ feedback includes one HARQ codebook per source identifier of the first UE.

Aspect 16: The method of any of aspects 1-16, further comprising: transmitting information indicating a number of HARQ codebooks that the first UE is capable of simultaneously generating, wherein the HARQ feedback is based at least in part on the number of HARQ codebooks.

Aspect 17: A method of wireless communication performed by a first user equipment (UE), comprising: transmitting, to a second UE via a sidelink interface, a triggering signal associated with triggering hybrid automatic repeat request (HARQ) feedback for a sidelink; and receiving, from the second UE and based at least in part on the triggering signal, HARQ feedback associated with the first UE.

Aspect 18: The method of aspect 17, wherein the first UE and the second UE are associated with a carrier aggregation configuration, and wherein the HARQ feedback relates to a plurality of carriers of the carrier aggregation configuration.

Aspect 19: The method of any of aspects 17-18, wherein the triggering signal is relayed via the first UE from a base station.

Aspect 20: The method of any of aspects 17-19, wherein the triggering signal is transmitted via a sidelink control channel, wherein the sidelink control channel does not schedule a data transmission in a corresponding sidelink shared channel, and wherein a slot including the sidelink control channel is allocated entirely for the sidelink control channel.

Aspect 21: The method of any of aspects 17-20, wherein the triggering signal is associated with information indicating a feedback resource for the HARQ feedback, and wherein the HARQ feedback is transmitted on the feedback resource.

Aspect 22: The method of any of aspects 17-21, wherein the HARQ feedback relates to each sidelink HARQ process associated with a source identifier of the first UE and to each carrier between the first UE and the second UE.

Aspect 23: The method of any of aspects 17-22, wherein the triggering signal is transmitted in a given slot, and wherein the HARQ feedback includes feedback only regarding slots before the given slot and the given slot.

Aspect 24: The method of any of aspects 17-22, wherein the triggering signal is transmitted in a given slot, and wherein the HARQ feedback includes feedback regarding a slot after the given slot based at least in part on a feedback deadline.

Aspect 25: The method of any of aspects 17-24, wherein the HARQ feedback is received in a communication that includes a flag indicating that the communication includes the HARQ feedback.

Aspect 26: The method of any of aspects 17-25, wherein the HARQ feedback is based at least in part on the triggering signal, wherein the HARQ feedback is one-shot HARQ feedback, and wherein the method further comprises: transmitting information indicating whether to provide at least one of the one-shot HARQ feedback, semi-static HARQ feedback, or dynamic HARQ feedback.

Aspect 27: The method of any of aspects 17-26, wherein the HARQ feedback includes one HARQ codebook per unicast link of the first UE and one HARQ codebook per groupcast link of the first UE.

Aspect 28: An apparatus for wireless communication at a device, comprising a processor; memory coupled with the processor; and instructions stored in the memory and executable by the processor to cause the apparatus to perform the method of one or more aspects of aspects 1-27.

Aspect 29: A device for wireless communication, comprising a memory and one or more processors coupled to the memory, the memory and the one or more processors configured to perform the method of one or more aspects of aspects 1-27.

Aspect 30: An apparatus for wireless communication, comprising at least one means for performing the method of one or more aspects of aspects 1-27.

Aspect 31: A non-transitory computer-readable medium storing code for wireless communication, the code comprising instructions executable by a processor to perform the method of one or more aspects of aspects 1-27.

Aspect 32: A non-transitory computer-readable medium storing a set of instructions for wireless communication, the set of instructions comprising one or more instructions that, when executed by one or more processors of a device, cause the device to perform the method of one or more aspects of aspects 1-27.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   a memory; and
   one or more processors, coupled to the memory, configured to:
      receive, from a second UE and via a sidelink interface, a triggering signal associated with triggering hybrid automatic repeat request (HARQ) feedback for a sidelink; and
      transmit, to the second UE and based at least in part on the triggering signal, HARQ feedback associated with the second UE,
         wherein the triggering signal is received in a physical sidelink control channel (PSCCH),
         wherein an entire slot in which sidelink control information (SCI), that conveys the triggering signal and is carried by the PSCCH, is received is dedicated to the SCI when the PSCCH does not schedule data transmission in a sidelink shared channel corresponding to the PSCCH, and
         wherein the HARQ feedback includes feedback only regarding slots before the entire slot and to the entire slot.

2. The first UE of claim 1, wherein the first UE and the second UE are associated with a carrier aggregation configuration, and wherein the HARQ feedback relates to a plurality of carriers of the carrier aggregation configuration.

3. The first UE of claim 1, wherein the triggering signal is associated with information indicating a feedback resource for the HARQ feedback, and wherein the HARQ feedback is transmitted on the feedback resource.

4. The first UE of claim 1, wherein the HARQ feedback is transmitted via a sidelink shared channel.

5. The first UE of claim 1, wherein the HARQ feedback relates to each sidelink HARQ process associated with a source identifier of the second UE and to each carrier between the first UE and the second UE.

6. The first UE of claim 1, wherein the HARQ feedback is provided in a communication that includes a flag indicating that the communication includes the HARQ feedback.

7. The first UE of claim 1, wherein the HARQ feedback is based at least in part on the triggering signal,
   wherein the HARQ feedback is one-shot HARQ feedback, and wherein the first UE is configured to:
receive information indicating whether to provide at least one of the one-shot HARQ feedback, semi-static HARQ feedback, or dynamic HARQ feedback.

8. The first UE of claim 7, wherein the received information is specific to at least one of:
a resource pool,
a sidelink carrier,
a sidelink bandwidth part,
a traffic cast type, or
a zone identifier.

9. The first UE of claim 1, wherein the HARQ feedback includes one HARQ codebook per unicast link of the first UE and one HARQ codebook per groupcast link of the first UE.

10. The first UE of claim 1, wherein the HARQ feedback includes one HARQ codebook per source identifier of the first UE.

11. The first UE of claim 1, wherein the one or more processors are further configured to:
transmit information indicating a number of HARQ codebooks that the first UE is capable of simultaneously generating, wherein the HARQ feedback is based at least in part on the number of HARQ codebooks.

12. The first UE of claim 1, wherein the SCI includes a bit indicating that the SCI includes or is the triggering signal.

13. The first UE of claim 1, wherein the one or more processors are further configured to:
decode the PSCCH in a slot that is after the entire slot.

14. The first UE of claim 1, wherein the one or more processors are further configured to:
receive a transport block (TB) after the HARQ feedback is triggered and before the HARQ feedback is transmitted.

15. The first UE of claim 1, wherein the triggering signal includes information indicating a physical sidelink feedback channel (PSFCH) resource for the HARQ feedback.

16. The first UE of claim 1, wherein the sidelink shared channel is a physical sidelink shared channel (PSSCH).

17. A first user equipment (UE) for wireless communication, comprising:
a memory; and
one or more processors operatively coupled to the memory, the one or more processors configured to:
transmit, to a second UE and via a sidelink interface, a triggering signal associated with triggering hybrid automatic repeat request (HARQ) feedback for a sidelink; and
receive, from the second UE and based at least in part on the triggering signal, HARQ feedback associated with the first UE,
wherein the triggering signal is received in a physical sidelink control channel (PSCCH),
wherein an entire slot in which sidelink control information (SCI), that conveys the triggering signal and is carried by the PSCCH, is received is dedicated to the SCI when the PSCCH does not schedule data transmission in a sidelink shared channel corresponding to the PSCCH, and
wherein the HARQ feedback includes feedback only regarding slots before the given entire slot and to the given entire slot.

18. The first UE of claim 17, wherein the first UE and the second UE are associated with a carrier aggregation configuration, and wherein the HARQ feedback relates to a plurality of carriers of the carrier aggregation configuration.

19. The first UE of claim 17, wherein the triggering signal is relayed via the first UE from a base station.

20. The first UE of claim 17, wherein the triggering signal is associated with information indicating a feedback resource for the HARQ feedback, and wherein the HARQ feedback is transmitted on the feedback resource.

21. The first UE of claim 17, wherein the HARQ feedback relates to each sidelink HARQ process associated with a source identifier of the first UE and to each carrier between the first UE and the second UE.

22. The first UE of claim 17, wherein the HARQ feedback is received in a communication that includes a flag indicating that the communication includes the HARQ feedback.

23. The first UE of claim 17, wherein the HARQ feedback is based at least in part on the triggering signal, wherein the HARQ feedback is one-shot HARQ feedback, and wherein the first UE is configured to:
transmit information indicating whether to provide at least one of the one-shot HARQ feedback, semi-static HARQ feedback, or dynamic HARQ feedback.

24. The first UE of claim 17, wherein the HARQ feedback includes one HARQ codebook per unicast link of the first UE and one HARQ codebook per groupcast link of the first UE.

25. The first UE of claim 17,
wherein the SCI includes a bit indicating that the SCI includes or is the triggering signal.

26. The first UE of claim 17, wherein the sidelink shared channel is a physical sidelink shared channel (PSSCH).

27. A method of wireless communication performed by a first user equipment (UE), comprising:
receiving, from a second UE and via a sidelink interface, a triggering signal associated with triggering hybrid automatic repeat request (HARQ) feedback for a sidelink; and
transmitting, to the second UE and based at least in part on the triggering signal, HARQ feedback associated with the second UE,
wherein the triggering signal is received in a physical sidelink control channel (PSCCH),
wherein an entire slot in which sidelink control information (SCI), that conveys the triggering signal and is carried by the PSCCH, is received is dedicated to the SCI when the PSCCH does not schedule data transmission in a sidelink shared channel corresponding to the PSCCH, and
wherein the HARQ feedback includes feedback only regarding slots before the entire slot and to the entire slot.

28. The method of claim 27, wherein the SCI includes a bit indicating that the sidelink control information includes or is the triggering signal.

29. A method of wireless communication performed by a first user equipment (UE), comprising:
transmitting, to a second UE and via a sidelink interface, a triggering signal associated with triggering hybrid automatic repeat request (HARQ) feedback for a sidelink; and
receiving, from the second UE and based at least in part on the triggering signal, HARQ feedback associated with the first UE,
wherein the triggering signal is received in a physical sidelink control channel (PSCCH),
wherein an entire slot in which sidelink control information (SCI), that conveys the triggering signal and is carried by the PSCCH, is received is dedicated to the SCI when the PSCCH does not schedule data transmission in a sidelink shared channel corresponding to the PSCCH, and wherein the HARQ feedback includes feedback only regarding slots before the entire slot and to the entire slot.

30. The method of claim 29,
wherein the SCI includes a bit indicating that the SCI includes or is the triggering signal.

* * * * *